(No Model.) 2 Sheets—Sheet 1.
S. CORAM & J. KUOLT.
VELOCIPEDE.
No. 443,499. Patented Dec. 30, 1890.
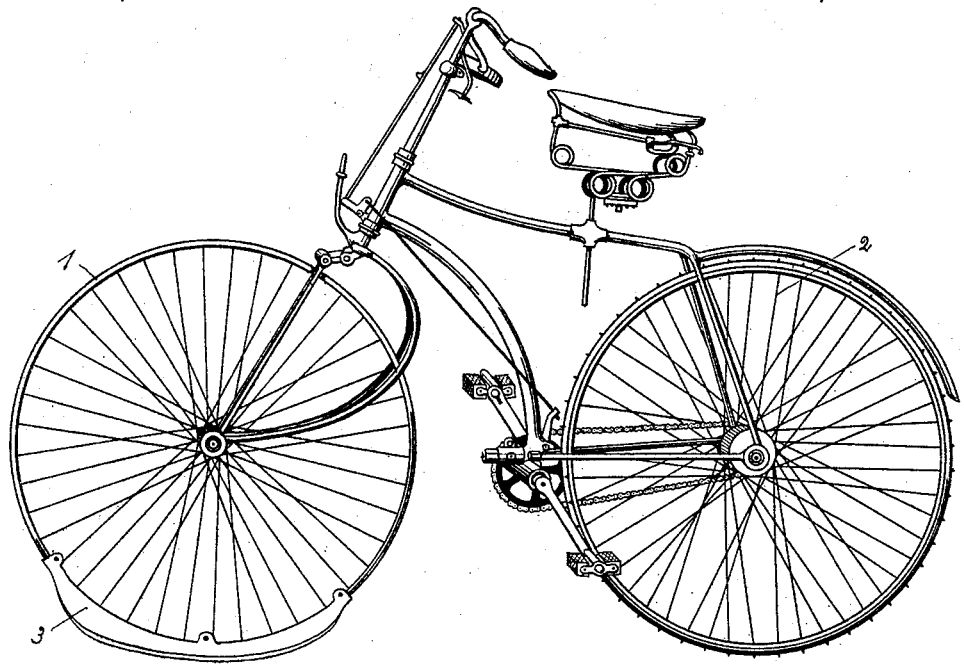
Fig. 1.
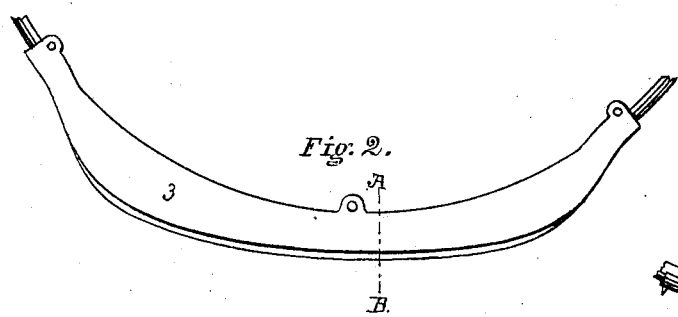
Fig. 2.
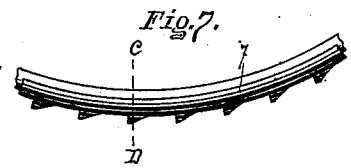
Fig. 7.
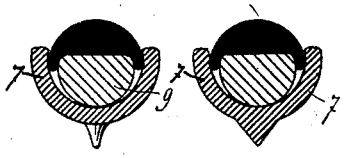
Fig. 5.
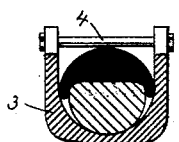 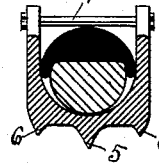 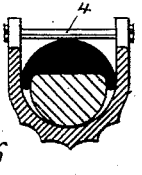
Fig. 3.   Fig. 4.   Fig. 9.   Fig. 6.   Fig. 8.
WITNESSES.
Rich. George.
L. S. Clarke.
INVENTOR.
Stephen Coram
Joseph Kuolt
By Risley Perry Attys.
THE NORRIS PETERS CO., PHOTO-LITHO., WASHINGTON, D. C.

(No Model.)

2 Sheets—Sheet 2.

S. CORAM & J. KUOLT.
VELOCIPEDE.

No. 443,499.

Patented Dec. 30, 1890.

WITNESSES.
Rich. George.

INVENTOR.
S. Coram
J. Kuolt
By Riley
atty.

UNITED STATES PATENT OFFICE.

STEPHEN CORAM AND JOSEPH KUOLT, OF UTICA, NEW YORK; SAID CORAM ASSIGNOR TO SAID KUOLT.

VELOCIPEDE.

SPECIFICATION forming part of Letters Patent No. 443,499, dated December 30, 1890.

Application filed February 17, 1890. Serial No. 340,665. (No model.)

*To all whom it may concern:*

Be it known that we, STEPHEN CORAM and JOSEPH KUOLT, both of the city of Utica, in the county of Oneida and State of New York, have invented certain new and useful Improvements in Bicycles or Velocipedes; and we do hereby declare that the following is a full, clear, and exact description of the invention, which will enable others skilled in the art to which it appertains to make and use the same, reference being had to the accompanying drawings, and to the figures of reference marked thereon, which form part of this specification.

Our invention relates to improvements in bicycles for adapting an ordinary bicycle for use on snow or ice.

Figure 10:
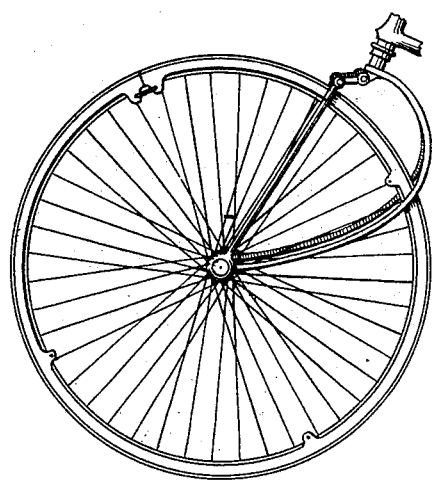
Figure 11:
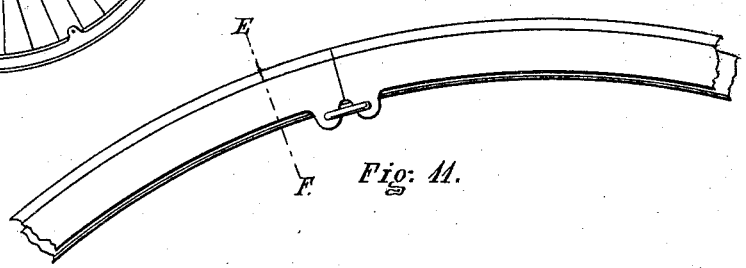

In the drawings which accompany and form a part of this specification, and in which similar figures of reference refer to like parts in the several figures, Figure 1 shows an ordinary Safety bicycle having our improvements attached. Fig. 2 shows the shoe or skate on a larger scale than that shown in Fig. 1 and a portion of the wheel. Fig. 3 shows a cross-section of the shoe or skate and felly and tire on line A B, Fig. 2. Fig. 4 shows a modified form of construction of the shoe or skate. Fig. 5 shows a portion of the removable spur-tire used upon the driving or propelling wheel. Fig. 6 shows a cross-section of the felly, tire, and removable spur-tire shown in Fig. 5. Fig. 7 shows a modified form of tire for the propelling-wheel having serrated teeth. Fig. 8 shows a cross-section on line C D of a wheel-rim having the modified form of construction of tire shown in Fig. 7 applied. Fig. 9 shows a modified form of construction of shoe or skate having a fluted bearing-surface. Fig. 10 shows a steering-wheel having a knife-edge tire. Fig. 11 shows an enlarged section of same.

Referring to the reference-numerals marked on the drawings, 1 indicates the forward or guiding wheel of a bicycle. 2 indicates the rear and driving wheel of the same.

Upon the steering-wheel we provide a skate or shoe 3, which may be secured to the rim of the wheel by a clasp or bolt 4 or any other equivalent means. The shoe is preferably grooved longitudinally or is U-shaped in cross-section to receive the rim of the wheel, and is provided on its under side, as shown in Fig. 3, with a downwardly-projecting longitudinal central edge 5; or it may be provided, as shown in Fig. 4, with downwardly-projecting edges 6 6, parallel with 5, but not projecting downward as far as 5 or having a fluted bearing-surface, as shown in Fig. 9.

Upon the driving-wheel we provide a removable U-shaped tire 7, provided with numerous spurs or creepers 8. The tire 7, being U-shaped, as shown in the cross-section in Fig. 6, enables it to be readily applied to the wheel without removing the rubber tire, which is indicated by 9, and thus obtain the benefit of its elasticity, although it is evident that a substantially round tire having spikes, as 8, could be used on the wheel in lieu of the rubber tire 9 by removing the same and still be within the spirit of our invention.

In the form of construction shown in Figs. 7 and 8 the tire is formed with a projecting edge, in which serrated teeth are formed, as shown in Fig. 8.

It is evident that the shoe 3 may be made to conform substantially to the curve of the wheel throughout its entire length instead of being deeper at each end, as shown in the drawings; or it may be a complete tire for the steering-wheel, as shown in Fig. 10.

In using our improvements the steering-wheel is secured from rotation and the shoe is applied to that portion of the wheel which would then come in contact with the ground by means of the clips 4, and the removable tire 7 is placed upon the driving-wheel and secured thereto by clamps or joint or any other common means for securing a removable tire, when the bicycle is in readiness for use on ice or compact snow, being used as an ordinary bicycle.

It is evident that other changes and modifications besides those described may be made in and from the construction shown without departing from the spirit of our invention.

What we claim as new, and desire to secure by Letters Patent, is—

1. The combination, with the steering-wheel of a bicycle or velocipede, of a substantially round elastic tire, a removable U-shaped tire in cross-section secured thereon, having a central longitudinal downwardly-projecting sharp edge on its under or bearing face, and a clamp for removably securing the tire to the wheel, substantially as set forth.

2. The combination, with the steering-wheel of a bicycle or velocipede, of a removable skate shoe or tire adapted to be secured to the wheel, having three downwardly-projecting longitudinal edges on its under or bearing surface, the central edge projecting downward farther than the other two, substantially as set forth.

3. The combination, with the propelling-wheel of a bicycle, of a felly, a substantially round rubber tire on the felly, a removable U-shaped tire in cross-section adapted to engage the round rubber tire and having projecting spurs or serrated teeth on its bearing-face, substantially as set forth.

4. The combination, with the steering-wheel of a bicycle, of a removable tire secured thereon, having a round bearing-face, and said bearing-face having a central longitudinal downwardly-projecting sharp edge, and a clamping device for removably securing the tire to the wheel, substantially as set forth.

5. The combination, with the steering-wheel of a bicycle or velocipede, of a removable tire secured thereon, having continuously-curved bearing-face in the direction of its length and a rounded face in the direction of its width, and a central longitudinal downwardly-projecting sharp edge thereon, said edge projecting to a greater distance from the regular outline of the shoe or tire than any other portion thereof, and a clamping device for removably securing the shoe or tire, substantially as set forth.

6. The combination, with the steering-wheel of a bicycle or velocipede, of a removable shoe or tire secured thereon, having a continuously-curved bearing-face in the line of its length and conforming substantially to the circumference of the steering-wheel, said bearing-face having a central longitudinal downwardly-projecting sharp edge on its under or bearing face, and the clamping device for removably securing the shoe or tire on the wheel, substantially as set forth.

7. The combination, with the steering-wheel of a bicycle or velocipede, of a substantially round rubber tire, a removable U-shaped tire in cross-section secured thereon, having a central curved bearing-face in the direction of its length, and longitudinal downwardly-projecting sharp edge on its under or bearing face, and the clamp for removably securing the tire on the wheel, substantially as set forth.

In witness whereof we have affixed our signatures in presence of two witnesses.

STEPHEN CORAM.
JOSEPH KUOLT.

Witnesses:
L. S. CLARKE,
MILTON E. ROBINSON.